US010387648B2

(12) United States Patent
Hirschberg et al.

(10) Patent No.: US 10,387,648 B2
(45) Date of Patent: Aug. 20, 2019

(54) RANSOMWARE KEY EXTRACTOR AND RECOVERY SYSTEM

(71) Applicant: Cisco Technology, Inc., San Jose, CA (US)

(72) Inventors: Benyamin Hirschberg, Givat-Zeev (IL); Moshe Kravchik, Ramat Beit Shemesh (IL); Arie Haenel, Jerusalem (IL); Hillel Solow, Beit Shemesh (IL)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 15/334,311

(22) Filed: Oct. 26, 2016

(65) Prior Publication Data

US 2018/0114020 A1 Apr. 26, 2018

(51) Int. Cl.
*G06F 21/56* (2013.01)

(52) U.S. Cl.
CPC ...... *G06F 21/566* (2013.01); *G06F 2221/034* (2013.01); *G06F 2221/2107* (2013.01)

(58) Field of Classification Search
CPC .......................... G06F 2221/034; G06F 21/566
See application file for complete search history.

(56) References Cited

U.S. PATENT DOCUMENTS

| 8,856,542 | B2 | 10/2014 | Tatarinov et al. |
| 9,213,838 | B2 | 12/2015 | Lu |
| 9,317,686 | B1 | 4/2016 | Ye et al. |
| 9,355,247 | B1 | 5/2016 | Thioux et al. |
| 10,055,582 | B1* | 8/2018 | Weaver ................. G06F 21/552 |
| 2016/0180087 | A1* | 6/2016 | Edwards ............... G06F 21/566 726/24 |
| 2017/0034189 | A1* | 2/2017 | Powell ................ H04L 63/1416 |
| 2017/0223031 | A1* | 8/2017 | Gu ......................... G06F 3/0623 |
| 2018/0007069 | A1* | 1/2018 | Hunt ................... H04L 63/1416 |
| 2018/0018458 | A1* | 1/2018 | Schmugar ............. G06F 21/566 |
| 2018/0075234 | A1* | 3/2018 | Boutnaru ............. G06F 21/554 |
| 2018/0075239 | A1* | 3/2018 | Boutnaru ............. G06F 21/554 |

FOREIGN PATENT DOCUMENTS

EP 3038003 6/2016

OTHER PUBLICATIONS

Pettersson, Torbjöm; "Cryptographic key recovery from linux memory dumps." Chaos Communication Camp 2007.

(Continued)

*Primary Examiner* — Hee K Song

(57) ABSTRACT

In one embodiment, a system includes a central processing unit (CPU) to identify a ransomware process which encrypted a plurality of files yielding a plurality of encrypted files, in response to identifying the ransomware process, dump a memory space and a state of the CPU yielding a memory dump, and search the memory dump for a plurality of candidate encryption keys, and a decryption engine to attempt to decrypt at least one encrypted file of the plurality of encrypted files with different candidate encryption keys of the plurality of candidate encryption keys until the at least one encrypted file is successfully decrypted with one candidate encryption key of the different candidate encryption keys, and decrypt the plurality of encrypted files using the one candidate encryption key. Related apparatus and methods are also described.

20 Claims, 3 Drawing Sheets

(56) References Cited

OTHER PUBLICATIONS

Reddit.com, Anti Ransom: Detect and Stop Ransomware via Honeypot, Dumping Memory for Key Extraction 2016; available on the web at: https://www.reddit.com/r/netsec/comments/4s9nlk/anti_ransom_detect_and_stop_ransomware_via.

Samvartaka—A king's ransom: an analysis of the CTB-locker ransomware: available on the web at: http://samvartaka.github.io/malware/2015/11/20/ctb-locker.

Jesus, Y.; Security Projects—Anti Ransom; available on the web at: http://www.security-projects.com/?Anti_Ransom#TOP.

Shamir, Adi et al.: "Hide and Seek" with Stored Keys. In Proceedings of the Third International Conference on Financial Cryptography (FC '99), Matthew K. Franklin (Ed.). Springer-Verlag, London, UK, UK, 118-124.

Song, Sangguan et al.; "The Effective Ransomware Prevention Technique Using Process Monitoring on Android Platform." Mobile Information Systems 2016 (2016).

Security Stack Exchange; available on the web at: http://security.stackexchange.com/questions/120748/what-should-you-do-if-you-catch-encryption-ransomware-mid-operation; Apr. 19, 2016.

Surfright—Hitman Pro Alert; available on the web at: http://www.surfright.nl/en/alert; Oct. 9, 2016.

Christodorescu, Mihal; Behavior-Based Malware Detection, Ph.D, Dissertation, University of Wisconsin at Madison, Madison, WI, USA. Advisor(s) Somesh Jha; 2007.

Barkan, Elad et al.; "The Book of Rijndaels", IACR Cryptology ePrint Archive 2002 (2002): 158.

Barkan, Elad et al.; "In how many ways can you write Rijndael?" In International Conference on the Theory and Application of Cryptology and Information Security, pp. 160-175. Springer Berlin Heidelberg, 2002.

Billet, O., et al.; "Cryptanalysis of a white box AES implementation"; In: Handschuh, H., Hasan, M.A. (eds.) SAC 2004, LNCS, vol. 3357, pp. 227-240. Springer, Heidelberg (2004).

Biryukov, A. et al.; A toolbox for cryptanalysis: Linear and Affine equivalence algorithms. In: Bijam, E. (ed.) EUROCRYPT 2003. LNCS, vol. 2656, pp. 33-50. Springer, Heidelberg (2003).

Gröbert, Felix et al.; "Automated identification of cryptographic primitives in binary programs" In International Workshop on Recent Advances in Intrusion Detection, pp. 41-60. Springer Berlin Heidelberg, 2011.

Hansen, S.S. et al.; "An approach for detection and family classification of malware based on behavioral analysis" 2016 International Conference on Computing, Networking and Communications (ICNC), Kauai, HI, 2016, pp. 1-5.

Kaplan, Brian; "RAM is Key Extracting Disk Encryption Keys From Volatile Memory" (Masters Thesis, Carnegie Mellon University, 2007).

Maartmann-Moe, Carsten; "Forensic Key Discovery and Identification: Finding Cryptographic Keys in Physical Memory." (2008). Norwegian Univ. of Science and Technology, Faculty of Information Technology, Mathematics and Electrical Engineering, Dept. of Telematics. Student Thesis.

Michiels, Wil et al.; "Cryptanalysis of White-Box Implementations"; IACR Cryptology ePrint Archive 2008 (2008): 105.

Endpoint Security—Malwarebytes, Santa Clara, 2016; available on the web at: https://www.malwarebytes.com/business/endpointsecurity/.

Free Forensics—Proactively Reaching to Ransomware; available on the web at: http://www.freeforensics.org/2016/03/proactively-reacting-to-ransomware.html.

* cited by examiner

RANSOMWARE KEY EXTRACTOR AND RECOVERY SYSTEM

TECHNICAL FIELD

The present disclosure generally relates to recovery from ransomware attacks.

BACKGROUND

Ransomware is computer malware that installs covertly on a victim's computer, executes a cryptovirology attack that adversely affects the victim's computer, and demands a ransom payment to restore the victim's computer to its former state. Simple ransomware may lock the victim's computer in a way which is not difficult for a knowledgeable person to reverse, and display a message requesting payment to unlock it. More advanced malware encrypts the victim's files, making them inaccessible, and demands a ransom payment to decrypt them. The ransomware may also encrypt the computer's Master File Table (MFT) or the entire hard drive. Thus, ransomware is a denial-of-access attack that prevents computer users from accessing files without employing a brute-force attack since it is generally impossible to decrypt the files without the decryption key. Ransomware attacks are typically carried out using a Trojan that has a payload disguised as a legitimate file.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a system including a central processing unit (CPU) to identify a ransomware process which encrypted a plurality of files yielding a plurality of encrypted files, in response to identifying the ransomware process, dump a memory space and a state of the CPU yielding a memory dump, and search the memory dump for a plurality of candidate encryption keys, and a decryption engine to attempt to decrypt at least one encrypted file of the plurality of encrypted files with different candidate encryption keys of the plurality of candidate encryption keys until the at least one encrypted file is successfully decrypted with one candidate encryption key of the different candidate encryption keys, and decrypt the plurality of encrypted files using the one candidate encryption key.

DETAILED DESCRIPTION

Figure 1:
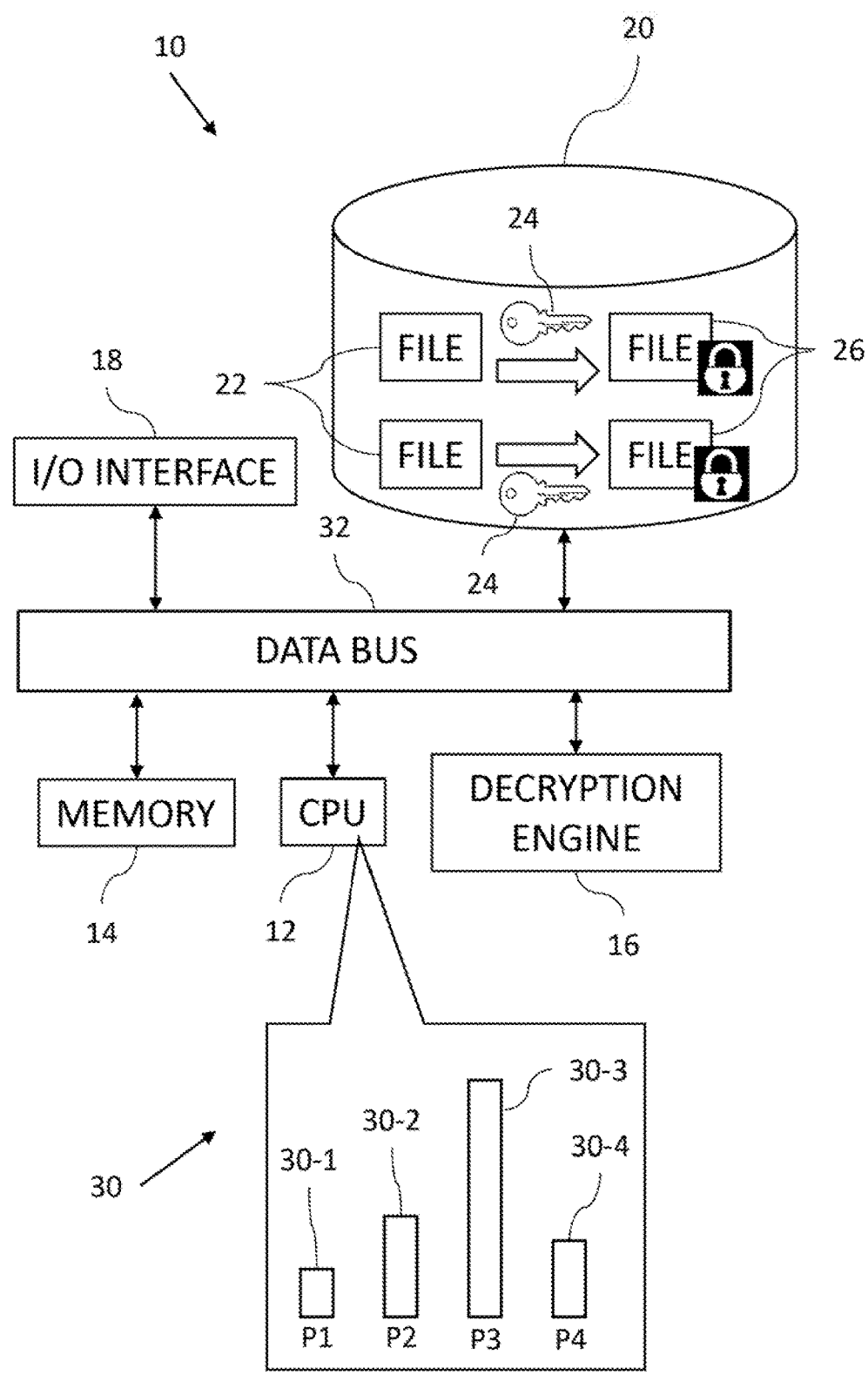
FIG. 1 is a block diagram view of system constructed and operative in accordance with an embodiment of the present disclosure

Reference is now made to FIG. 1, which is a block diagram view of system 10 constructed and operative in accordance with an embodiment of the present disclosure. The system 10 includes: a central processing unit (CPU) 12; a memory 14 to store data used by the CPU 12; a decryption engine 16; an input/output (I/O) interface 18; a data storage unit 20 which may include any suitable data storage technology such as a hard disk or flash disk; and a data bus 32 for connecting the various elements of the system 10 together for data transfer purposes. It will be appreciated that the decryption engine 16 may be implemented as part of the CPU 12 or as a separate element. The I/O interface 18 may be implemented as any I/O interface for receiving data from, and transferring data to, a device external to the system 10 via any suitable communication medium, for example, but not limited to, an Internet Protocol system, a cable system, a USB connection and/or cable (e.g., from a USB device operationally connected to the system 10) and/or a cellular system. It will be appreciated that the I/O interface 18 may be implemented as one or more transceivers and/or one or more receivers and transmitters. It will also be appreciated that ransomware may enter the system 10 via the I/O interface 18. The CPU 12 is described herein as performing various functions. It will be appreciated that the functions of the CPU 12 may be performed by the CPU 12 running suitably programmed software and/or suitably configured hardware.

FIG. 1 shows four processes 30 running on the CPU 12. It will be appreciated that four processes 30 (individually labeled 30-1, 30-2, 30-3 and 30-4) are shown by way of example only and that any number of suitable processes may be running on the CPU 12. The process 30-3 is using significantly more (in this example over 100% more) processing power than the other processes 30-1, 30-2, 30-4. Significant use of processing power may be a factor used in determining that a process is a possible ransomware process. This and other factors are described in more detail with reference to FIG. 3. For the sake of this example, it may be assumed that the process 30-3 is a ransomware process that is encrypting files 22 stored in the data storage unit 20. In particular, FIG. 1 shows that two files 22 stored in the data storage unit 20 have been encrypted by the ransomware process 30-3 using an encryption key 24 to yield two respective encrypted files 26.

Figure 2:
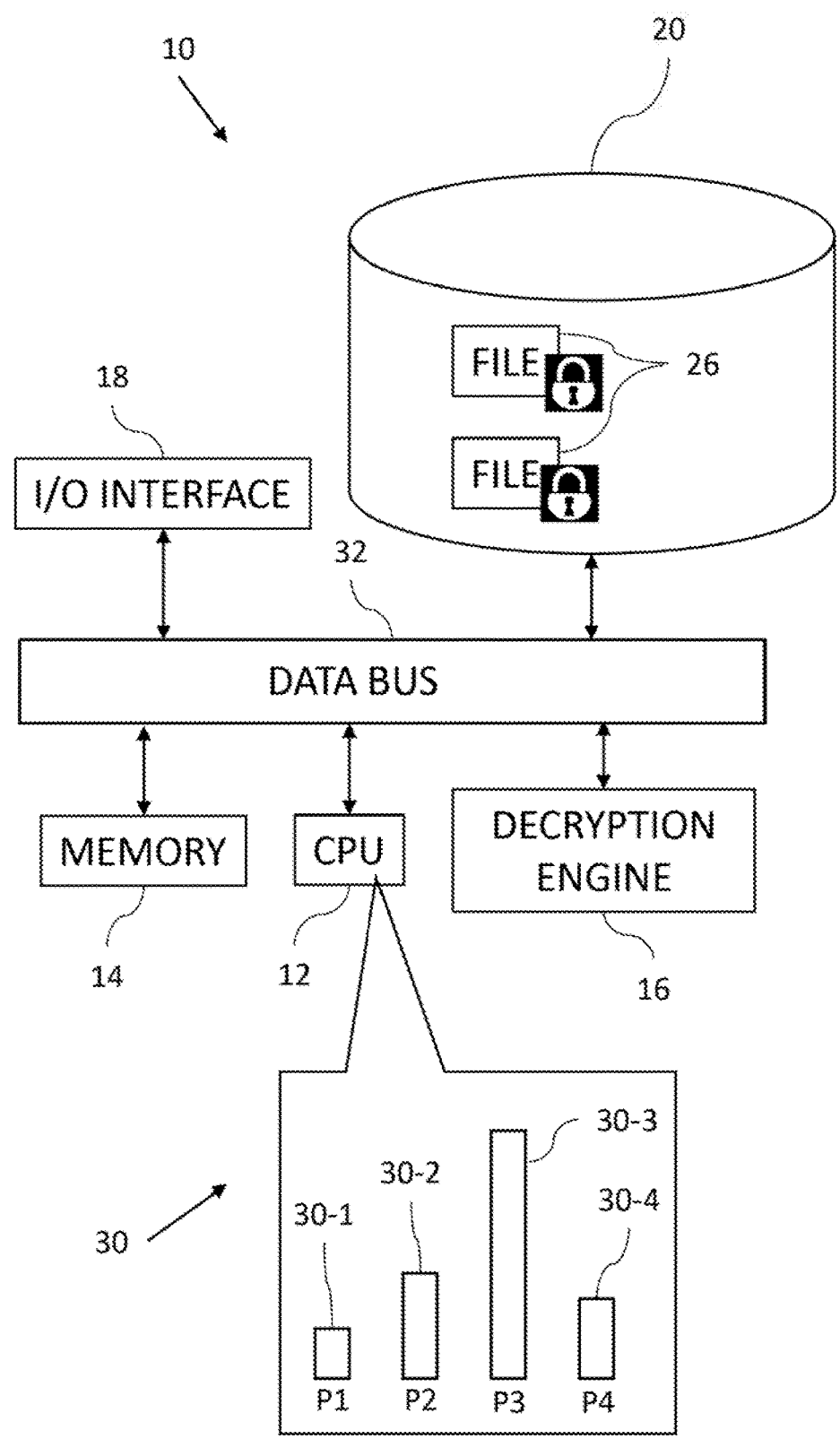
FIG. 2 is a block diagram view of the system of FIG. 1 at a later time.

Reference is now made to FIG. 2, which is a block diagram view of the system of FIG. 1 at a later time. The original files 22 (FIG. 1) are then deleted by the ransomware process 30-3 leaving the respective encrypted files 26 in the data storage unit 20 in place of the unencrypted files 22.

It will be appreciated that the files 22 may have been willingly encrypted by a user of the system 10 prior to the ransomware process 30-3 subsequently further encrypting the files 22 in order to protect the data in the files 22. Then the ransomware process 30-3 infects the system 10 and further encrypts the previously encrypted files 22.

In overview, the system 10 is operative to identify the ransomware process 30-3 and based on the identification of the ransomware process 30-3 to attempt to suspend the ransomware process 30-3 and try to search for candidate encryption keys in memory 14. The candidate encryption keys are tested on a trial and error basis as follows. A candidate encryption key is selected and used to see if the selected key decrypts one or more of the respective encrypted files 26. This selection and trial decryption stage is repeated until a successful candidate encryption key is found. When the successful key is found any remaining respective encrypted files 26 are decrypted.

It will be appreciated that the system 10 may be any suitable processing system, for example, but not limited to, a desk top computer, a laptop computer, a tablet device, a mobile phone or a server.

Figure 3:
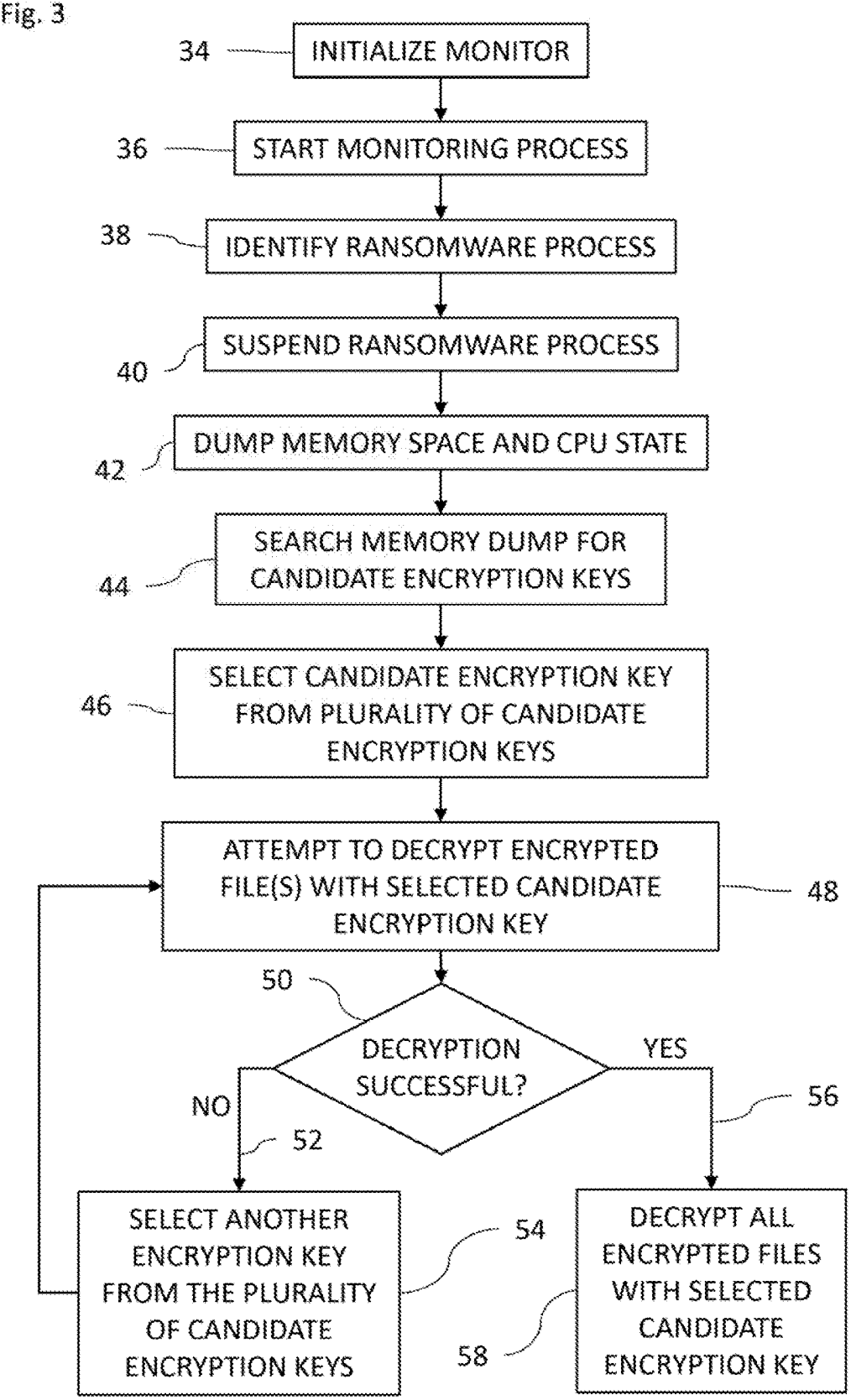
FIG. 3 is a flow chart showing steps in an exemplary method of operation of the system of FIG. 1.

Reference is now made to FIG. 3, which is a flow chart showing steps in an exemplary method of operation of the system 10 of FIG. 1. Reference is also made to FIG. 1. The CPU 12 runs an operating system (not shown) which is operative to initialize a ransomware monitor (block 34). The CPU 12 is operative to start a monitoring process of the ransomware monitor (block 36). As part of the monitoring process, the load of processes of the CPU 12 and the input/output function to the data storage unit 20 are monitored among other factors. The exact factors which are monitored will largely be a function of the methods used to monitor for a ransomware process discussed in more detail below. The CPU 12 is operative, via the monitoring process, to identify a ransomware process, e.g., ransomware process 30-3, which encrypted the files 22 yielding the encrypted files 26 (block 38). The system 10 may use any suitable monitoring method to identify ransomware, for example, but not limited to, using behavioral heuristics to identify a running and active ransomware process. The behavioral heuristic monitoring methods at this stage may include analyzing features such as disk access rate, access behavior, processor usage peaks, and/or honeypot files. Once a suspicious process is suspected, the CPU 12 is operative to perform a deeper analysis in order to verify that the suspicious process is indeed ransomware. It will be appreciated that ransomware detection is usually not a precise science. Similar to viruses, ransomware does its best to hide and masquerade as a benign process. The methods listed above are examples of behavioral heuristics based on knowledge of common patterns in ransomware activities. It will be appreciated that detection methods may evolve and expand as ransomware evolves to evade detection. The monitoring stage, provides methods for covering a wide population of ransomware which may result in false positives while avoiding false negatives.

Different monitoring techniques may indicate presence of ransomware. Each technique may provide a score that is indicative of whether a particular process is ransomware. The sum of the scores from the different techniques may be compared to a predetermined overall score which indicates that a process may be ransomware and should be investigated in more detail and possibly suspended. The behavioral heuristic methods briefly described above are now described in more detail.

The CPU 12 may create honeypot files which are files of types that are usually targeted by ransomware (for example, but not limited to, pictures and documents) typically with random names in random places in the data storage unit 20. The honey pot files are then monitored by the CPU 12 for changes to their content, directly or by application program interface (API) monitoring. Another variation on honey pot files is for the CPU 12 to create a false network share with dummy files and monitor them for changes. Disk access may also be monitored by the CPU 12. Ransomware typically opens a file, reads the file and rewrite the full content of the file and then moves on to another file. This disk access behavior may be differentiable from other tools scanning files like antivirus, backup etc. that do not rewrite the whole content of the file. Therefore, disk access behavior may be indicative of ransomware. The CPU 12 is therefore also operative to monitor disk access behavior. Large scale file renaming, in the hundreds and thousands is another example of well-known ransomware behavior. The CPU 12 is therefore operative to monitor the file renames. As described above, ransomware typically encrypts files. The CPU 12 is operative to monitor changes in processor load. Data encryption is a CPU intensive process. As soon as CPU utilization for a process exceeds a predefined threshold, the ransomware score may be increased. Alternatively, the ransomware score may be proportional to the CPU activity.

In response to detecting a potential ransomware process, the CPU 12 may be operative to suspend the ransomware process (block 40) thereby preventing any further damage. The suspension of the ransomware process may take place before, during, or after the deeper analysis has been completed.

The deeper analysis stage of the ransomware monitoring is now described in more detail below. The deeper analysis performs more detailed checking on the activities of the suspicious process and the artefacts of the process (e.g., files affected) to verify that the suspected process is ransomware. Some sample methods applied during the deeper analysis phase may include the following methods.

The CPU 12 may analyze files changed by the suspected ransomware process. For known file formats the CPU 12 is operative to distinguish unencrypted files from encrypted ones. Entropy analysis generally indicates encryption for arbitrary files. Therefore, the CPU 12 is operative to monitor for file encryption which may include looking for changes in the entropy of a file as encrypted files have a higher entropy.

The CPU 12 may analyze the code active in the suspicions process. Presence and usage of cryptographic CPU instructions and/or calls to cryptographic libraries as well as random numbers generators generally indicate ongoing encryption activity and a likely ransomware process. Dynamic binary instrumentation and/or hardware-assisted process tracing techniques might be used to facilitate such analysis.

The ransomware monitoring including the deeper analysis stage may provide information which is used in the encryption key identification process. Beyond identifying the ransomware process, the monitor may identify the "active" periods of the ransomware process by analyzing the CPU time, memory and I/O usage. The aspect of catching the ransomware during the active periods allows the system 10 to find the times when the encryption key 24 is generally in the memory 14 in some form. The monitor is operative to identify which parts of the process code consumed the most time. The identified parts may indicate which memory chunks include the buffer holding the encryption key 24. It will be appreciated that identifying the active periods and the buffer holding the encryption key 24 may lead to a quicker revelation of the candidate encryption keys. The monitor may also perform fingerprint identification in addition to behavioral analysis. For example, any sufficiently long string of 0's and 1's can be a "fingerprint" for a particular program because it is very unlikely that a different, randomly selected program will just happen to have the same long sequence of instructions represented by the 0's and 1's. Since most viruses including ransomware copy themselves verbatim when they reproduce, they are easily caught by a program which scans all executable files for fingerprints of known viruses. The behavioral analysis and the fingerprint identification may help identify the ransomware type which may assist the key search and extraction based on historical data as to how a particular ransomware uses the encryption key 24, further focusing the search for the encryption key 24. The monitor is operative to log file access performed by the suspected ransomware process to help identify which files have been encrypted. This information may be used to determine which file(s) may be used to test the candidate encryption keys. The monitor may also block the ransomware process when the ransomware process writes the encrypted files 26 to the data storage unit 20 which increases the likelihood that the encryption key 24 is in the memory 14.

The CPU 12 is operative, in response to identifying the ransomware process 30-3, to dump a memory space and a state of the CPU 12 yielding a memory dump (block 42). The CPU 12 is operative to search the memory dump for a plurality of candidate encryption keys (block 44). Instead of traversing all the processes 30 that the CPU 12 is running when looking for the candidate keys, the CPU 12 is operative to analyze the suspected ransomware process 30-3 for keys. Nevertheless, since an entire memory-dump of the ransomware process 30-3 may lead to too many candidate encryption keys for the ransomware recovery process to be efficient, the CPU 12 may employ a number of techniques to narrow down the number of candidate encryption keys as follows. In general, the CPU 12 is operative to identify encryption code and the data which it uses. The CPU 12 may be operative to search for cryptographic CPU instructions in process code to identify at least one of the plurality of candidate encryptions keys in the memory dump. For example, during encryption, the instruction pointer typically spends considerably more time than other processes in a narrow range of addresses. The CPU 12 may be operative to search for encryption code using instruction pointer monitoring to identify at least one of the plurality of candidate encryptions keys in the memory dump. The CPU 12 may define ransomware families based on the different encryption algorithms the families use. The information about the encryption algorithms of the ransomware families may be used in monitoring, analysis and/or identifying future ransomware processes. The CPU 12 may be operative to search for code using random number generation to identify at least one of the plurality of candidate encryption keys in the memory dump. The CPU 12 may be operative to search for code running a service used in data encryption to identify at least one of the plurality of candidate encryptions keys in the memory dump. The CPU 12 is operative to use at least one result found in the identification of the ransomware process, in particular from the deeper analysis stage, to identify at least one of the plurality of candidate encryptions keys in the memory dump. Heuristics may be used to ascertain which ransomware techniques might be active on the device which may assist the key search and extraction based on historical data as to how a particular ransomware uses the encryption key 24, further focusing the search for the encryption key 24. For example, if a certain ransomware uses a known file renaming scheme this information may be used to find encrypted files and possibly the key in memory based on the known file names. Other information which may be used in a similar manner includes, by way of example only: markers used to detect an already infected machine (files, registry entries, alternative data streams (ADS), semaphore, mutex, shared section etc.); changes done to shadow copies or master boot record (MBR); and a message used to signal the infection (usually displayed after the total encryption phase has taken place, but the message is already present in the computer); and access to known servers.

After collecting the candidate encryption keys, the decryption engine 16 is operative to attempt to decrypt at least one encrypted file 26 with different candidate encryption keys until the at least one encrypted file 26 is successfully decrypted with one candidate encryption key of the different candidate encryption keys. In other words, the decryption engine 16 is operative to try each candidate encryption key until one or more of the encrypted files 26 is successfully decrypted.

Testing the candidate encryption keys is now described in more detail. The CPU 12 is operative to select a candidate encryption key from the plurality of candidate encryption keys (block 46). The decryption engine 16 is operative to attempt to decrypt one or more of the encrypted files 26 with the selected candidate encryption key (block 48). The CPU 12 is operative to determine if the decryption is successful (block 50). Successful decryption may be determined as follows. If file format is known, the file format header is validated for that file type. If the file format is unknown or cannot be validated, the entropy of the decrypted file may be analyzed to see if the entropy of the bits in the decrypted file is less than before decryption, thereby indicating that decryption is successful. If the decryption is not successful (branch 52) the CPU 12 is operative to select another candidate encryption key from the plurality of candidate encryption keys (block 54) and then the method continues with the step of block 48. If the decryption is successful (branch 56) the decryption engine 16 is operative to store the selected candidate decryption key safely and decrypt all the other encrypted files 26 using the selected candidate encryption key (block 58). Storing the decryption key safely may follow industry best practices of handling the key including preserving the key's confidentiality and integrity, not leaking the key through side channels etc. After the encrypted files have been recovered the key may be discarded unless there is another use for the key, for example, if the ransomware process reuses keys then it may be worthwhile to share the key with a backend system. The CPU 12 may be operative to notify a backend system about the discovered ransomware and the characteristics of the discovered ransomware in order to propagate the knowledge and prevent ransomware spread.

It should be noted that the system 10 may be used where a ransomware process encrypts some files with one key and other files with another key etc. In such a case, the above process may be repeated as necessary until all the keys are found for decrypting all the encrypted files.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising:
a central processing unit (CPU) to:
identify a ransomware process which encrypted a plurality of files yielding a plurality of encrypted files;
in response to identifying the ransomware process, dump a memory space and a state of the CPU yielding a memory dump; and
search the memory dump for a plurality of candidate encryption keys by determining that an instruction pointer spends more time than other processes in a set of memory addresses; and
a decryption engine to:
attempt to decrypt at least one encrypted file of the plurality of encrypted files with different candidate encryption keys of the plurality of candidate encryption keys until the at least one encrypted file is successfully decrypted with one candidate encryption key of the different candidate encryption keys; and
decrypt the plurality of encrypted files using the one candidate encryption key.

2. The system according to claim 1, wherein the CPU is operative to suspend the ransomware process.

3. The system according to claim 1, wherein the CPU is operative to search for cryptographic CPU instructions in process code to identify at least one of the plurality of candidate encryptions keys in the memory dump.

4. The system according to claim 1, wherein the CPU is operative to search for encryption code using instruction pointer monitoring to identify at least one of the plurality of candidate encryptions keys in the memory dump.

5. The system according to claim 1, wherein the CPU is operative to search for code using random number generation to identify at least one of the plurality of candidate encryptions keys in the memory dump.

6. The system according to claim 1, wherein the CPU is operative to search for code running a service used in data encryption to identify at least one of the plurality of candidate encryptions keys in the memory dump.

7. The system according to claim 1, wherein the CPU is operative to use at least one result found in identification of the ransomware process to identify at least one of the plurality of candidate encryptions keys in the memory dump.

8. A method comprising:
identifying a ransomware process which encrypted a plurality of files yielding a plurality of encrypted files;
in response to identifying the ransomware process, dumping a memory space and a state of a central processing unit (CPU) yielding a memory dump;
searching the memory dump for a plurality of candidate encryption keys by determining that an instruction pointer spends more time than other processes in a set of memory addresses;
attempting to decrypt at least one encrypted file of the plurality of encrypted files with different candidate encryption keys of the plurality of candidate encryption keys until the at least one encrypted file is successfully decrypted with one candidate encryption key of the different candidate encryption keys; and
decrypting the plurality of encrypted files using the one candidate encryption key.

9. The method according to claim 8, further comprising suspending the ransomware process.

10. The method according to claim 8, further comprising searching for cryptographic CPU instructions in process code to identify at least one of the plurality of candidate encryptions keys in the memory dump.

11. The method according to claim 8, further comprising searching for encryption code using instruction pointer monitoring to identify at least one of the plurality of candidate encryptions keys in the memory dump.

12. The method according to claim 8, further comprising searching for code using random number generation to identify at least one of the plurality of candidate encryptions keys in the memory dump.

13. The method according to claim 8, further comprising searching for code running a service used in data encryption to identify at least one of the plurality of candidate encryptions keys in the memory dump.

14. The method according to claim 8, further comprising using at least one result found in identification of the ransomware process to identify at least one of the plurality of candidate encryptions keys in the memory dump.

15. A software product, comprising a non-transient computer-readable medium in which program instructions are stored, which instructions, when read by a central processing unit (CPU), cause the CPU to:
identify a ransomware process which encrypted a plurality of files yielding a plurality of encrypted files;
in response to identifying the ransomware process, dump a memory space and a state of the CPU yielding a memory dump;
search the memory dump for a plurality of candidate encryption keys by determining that an instruction pointer spends more time than other processes in a set of memory addresses;
attempt to decrypt at least one encrypted file of the plurality of encrypted files with different candidate encryption keys of the plurality of candidate encryption keys until the at least one encrypted file is successfully decrypted with one candidate encryption key of the different candidate encryption keys; and
decrypt the plurality of encrypted files using the one candidate encryption key.

16. The software product according to claim 15, wherein the CPU is operative to suspend the ransomware process.

17. The software product according to claim 15, wherein the CPU is operative to search for cryptographic CPU instructions in process code to identify at least one of the plurality of candidate encryptions keys in the memory dump.

18. The software product according to claim 15, wherein the CPU is operative to search for encryption code using instruction pointer monitoring to identify at least one of the plurality of candidate encryptions keys in the memory dump.

19. The software product according to claim 15, wherein the CPU is operative to search for code using random number generation to identify at least one of the plurality of candidate encryptions keys in the memory dump.

20. The software product according to claim 15, wherein the CPU is operative to search for code running a service used in data encryption to identify at least one of the plurality of candidate encryptions keys in the memory dump.

* * * * *